US009120963B2

(12) United States Patent
Willberg et al.

(10) Patent No.: US 9,120,963 B2
(45) Date of Patent: Sep. 1, 2015

(54) DELAYED WATER-SWELLING MATERIALS AND METHODS OF USE (75) Inventors: Dean M. Willberg, Tucson, AZ (US); Kseniya Nosova, Berdsk (RU); Marina Bulova, Moscow (RU); Simon James, Le Plessis-Robinson (FR); Sergey Sokolov, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 1074 days.

(21) Appl. No.: 11/557,756

(22) Filed: Nov. 8, 2006

(65) Prior Publication Data
US 2008/0108524 A1 May 8, 2008

(51) Int. Cl.
| E21B 33/00 | (2006.01) |
| C09K 8/516 | (2006.01) |
| C09K 8/035 | (2006.01) |
| C09K 8/68 | (2006.01) |
| C09K 8/80 | (2006.01) |
| E21B 33/138 | (2006.01) |

(52) U.S. Cl.
CPC ............ *C09K 8/516* (2013.01); *C09K 8/035* (2013.01); *C09K 8/68* (2013.01); *C09K 8/805* (2013.01); *C09K 2208/18* (2013.01); *E21B 33/138* (2013.01)

(58) Field of Classification Search
None
See application file for complete search history.

(56) References Cited

U.S. PATENT DOCUMENTS

| 2,634,098 | A | * | 4/1953 | Armentrout ..................... 175/72 |
| 2,836,555 | A | | 5/1958 | Armentrout et al. |
| 3,353,601 | A | * | 11/1967 | Dollarhide et al. ............ 166/283 |
| 3,952,741 | A | | 4/1976 | Baker |
| 3,983,254 | A | | 9/1976 | Alterman et al. |
| 4,506,734 | A | | 3/1985 | Nolte |
| 4,548,847 | A | | 10/1985 | Aberson et al. |
| 4,658,861 | A | | 4/1987 | Roberson, Sr. |
| 4,664,816 | A | | 5/1987 | Walker |
| 4,670,166 | A | | 6/1987 | McDougall et al. |
| 4,713,251 | A | | 12/1987 | Seighman |
| 4,725,628 | A | | 2/1988 | Garvey et al. |
| 4,741,401 | A | | 5/1988 | Walles et al. |
| 4,770,796 | A | | 9/1988 | Jacobs |
| 4,772,477 | A | | 9/1988 | Weiss et al. |
| 4,836,940 | A | | 6/1989 | Alexander |
| 4,848,467 | A | | 7/1989 | Cantu et al. |
| 4,933,190 | A | | 6/1990 | Cherukuri et al. |
| 4,957,165 | A | | 9/1990 | Cantu et al. |
| 4,978,537 | A | | 12/1990 | Song |
| 4,986,354 | A | | 1/1991 | Cantu et al. |
| 4,986,355 | A | | 1/1991 | Casad et al. |
| 5,110,486 | A | | 5/1992 | Manalastas et al. |
| 5,164,099 | A | | 11/1992 | Gupta et al. |
| 5,373,901 | A | | 12/1994 | Norman et al. |
| 5,476,543 | A | | 12/1995 | Ryan |
| 5,505,740 | A | | 4/1996 | Kong et al. |
| 5,716,923 | A | | 2/1998 | MacBeath |
| 5,910,322 | A | | 6/1999 | Rivett et al. |
| 5,922,652 | A | | 7/1999 | Kowalski et al. |
| 5,948,735 | A | | 9/1999 | Newlove et al. |
| 6,105,674 | A | | 8/2000 | Liao |
| 6,169,058 | B1 | * | 1/2001 | Le et al. ........................ 507/222 |
| 6,561,273 | B2 | * | 5/2003 | Brothers et al. ............... 166/294 |
| 6,581,701 | B2 | * | 6/2003 | Heying ............................ 175/72 |
| 6,777,377 | B2 | | 8/2004 | Myers et al. |
| 6,841,229 | B2 | | 1/2005 | Sun et al. |
| 7,004,255 | B2 | | 2/2006 | Boney |
| 7,066,285 | B2 | | 6/2006 | Shaarpour |
| 2002/0039869 | A1 | | 4/2002 | Achille |
| 2004/0094300 | A1 | | 5/2004 | Sullivan |
| 2004/0244978 | A1 | * | 12/2004 | Shaarpour ..................... 166/293 |
| 2005/0000690 | A1 | * | 1/2005 | Boney ........................ 166/280.2 |
| 2005/0006093 | A1 | * | 1/2005 | Nguyen ......................... 166/281 |
| 2005/0028979 | A1 | | 2/2005 | Brannon et al. |
| 2005/0080182 | A1 | * | 4/2005 | Ahmed et al. ................. 524/458 |
| 2006/0035790 | A1 | * | 2/2006 | Okell et al. .................... 507/269 |
| 2006/0046938 | A1 | | 3/2006 | Harris |
| 2006/0079408 | A1 | | 4/2006 | Verret |
| 2006/0086501 | A1 | | 4/2006 | Creel et al. |
| 2007/0044963 | A1 | | 3/2007 | MacDougall |

FOREIGN PATENT DOCUMENTS

| WO | 2004101463 A2 | 11/2004 |
| WO | 2004101952 A1 | 11/2004 |
| WO | 2005110942 A2 | 11/2005 |

OTHER PUBLICATIONS

G-Seal Product Bulletin, 1998 M-I, LLC, MI-10765 3M 5/98 Litho in U.S.A.
G-Seal Plus Product Bulletin, 2005 M-I, LLC, FPB.07660766.0510. RI(E).
Steelseal, Lost Circulation Material, 2006 Halliburton.
Examiner's Report dated Aug. 20, 2013 issued for Canadian Patent Application No. 2,668,857, 3 pages.
(Continued)

*Primary Examiner* — Angela M DiTrani
(74) *Attorney, Agent, or Firm* — Jeremy D. Tillman; Rachel E. Greene; Tim Curington (57) ABSTRACT

A water absorbing composition includes a particle having a core of a water-swelling material. A coating substantially surrounds the core that temporarily prevents contact of water with the water-swelling material. The coating may be formed from a layer of water degradable material or a non-water-degradable, non-water absorbent encapsulating layer. A quantity of particles including delayed water-swelling particles formed at least in part from a water-swelling material and, optionally, non-water-swelling particles of the same or different size distributions can be used in treating a formation penetrated by a wellbore. A slurry of the particles is formed with a carrier fluid. The slurry of particles is introduced into the wellbore of the formation to facilitate treatment.

22 Claims, 3 Drawing Sheets

(56) References Cited

OTHER PUBLICATIONS

Examiner's Report issued for Canadian Patent Application No. 2,668,857 mailed on Oct. 29, 2012, 3 pages.

Mexican Office Action for corresponding Mexican Application Serial No. MX/a/2009/004485 dated Aug. 5, 2014 with English translation, 6 pgs.

* cited by examiner

DELAYED WATER-SWELLING MATERIALS AND METHODS OF USE

BACKGROUND

In subterranean formations of oil and gas wells, the formation may have insufficient stress barriers to contain hydraulic fractures made within the producing zone. This can lead to inefficient fracturing, with much of the treatment potentially stimulating bare rock. Vertical fracture growth out of the hydrocarbon bearing portions of the formation, either up or down, may result from hydraulic fracturing in such formations having little or no stress contrast between the formation layers. A particular problem encountered in formations where there are insufficient stress barriers is the fracturing or stimulation of water or undesirable gas producing zones.

Containment of these undesirable fractures has been accomplished in the past by placing an artificial barrier along the boundaries of the fracture to prevent further fracture growth out of the producing zone. Known methods for containing fracture growth include placing of proppants and fluids with different densities in the fracture to limit the undesirable fracture growth. The main drawback to such techniques is the difficulty of providing proper barrier placement such that the prior art methods are unreliable.

In drilling operations, undesirable fractures may form in areas adjacent to the well bore resulting in the lost circulation of drilling fluid. Eventually, in highly permeable formations, fluid is lost from the drilling fluid within the fracture so that the mud consequently becomes dehydrated and blocks the fracture so that there is no transmission of pressure to the tip of the fracture and further fracture propagation is prevented. In shale or low permeability formations, however, where there is little or no fluid loss to the formation, the fracture tends to keep propagating, particularly when using high pressure or high density drilling fluids.

There is therefore a need to provide improvements in compositions and methods used for containing such fractures.

SUMMARY

One embodiment of the invention is a water absorbing composition containing a particle having a core of a water-swelling material and a coating substantially surrounding the core that temporarily prevents contact of water with the water-swelling material; the coating is formed from at least one of (1) a layer or layers of water degradable material and (2) a non-water-degradable, non-water absorbent layer or layers of encapsulating material. In various versions of this embodiment: the water-swelling material is at least one of a clay and a superabsorbing material; the clay is selected from bentonite, montmorillonite, smectite, nontronite, beidellite, perlite and vermiculite clays and combinations of these, and the superabsorbing material is selected from polymers and copolymers of acrylate, acrylic acid, amide, acrylamide, saccharides, vinyl alcohol, urethane, and combinations of these materials; the water degradable material is a solid polymer acid precursor, for example a polylactic acid coating; the core further contains a weighting material, for example selected from silicates, aluminosilicates, barite, hematite, ilmenite, manganese tetraoxide, manganosite, iron, lead, aluminum and combinations of these; the core includes an inner core of proppant material with an outer layer of the water absorbent material formed around the proppant material; the water-swelling material is a superabsorbent material that has been surface cross-linked to delay swelling further; and the water-swelling material is capable of absorbing at least the water-swelling material's weight of water.

Another embodiment of the invention is a method of treating a formation penetrated by a wellbore including the steps of: providing a quantity of particles containing delayed water-swelling particles formed at least in part from a water-swelling material and non-water-swelling particles of different size distributions; forming a slurry of the particles with a carrier fluid; and introducing the slurry of particles into the wellbore of the formation. In various aspects of this embodiment: the non-water-swelling particles have a particle size of from about 0.035 mm to about 2.35 mm; non-water-swelling particles of at least two different size distributions are used in which the mean particle size of the larger non-water-swelling particles is at least 1.5 times greater than that of the smaller non-water-swelling particles; the non-water-swelling particles include coarse particles having a particle size of from about 0.2 mm to about 2.35 mm and at least one of fine particles having a particle size of less than about 0.1 mm and medium particles having a particle size of from about 0.1 mm to less than about 0.2 mm; the water-swelling material is a superabsorbent material that has been surface cross-linked to delay swelling; the particles have a specific gravity that is at least one of the same, greater or less than the specific gravity of the carrier fluid; the water-swelling material is at least one of a clay and a superabsorbing material; the clay is selected from bentonite, montmorillonite, smectite, nontronite, beidellite, perlite and vermiculite clays and combinations of these, and the superabsorbing material is selected from polymers and copolymers of acrylate, acrylic acid, amide, acrylamide, saccharides, vinyl alcohol, urethane, and combinations of these materials; the delayed water-swelling particles are formed from particles having a core of water-swelling material with a coating of water degradable material; the water degradable material is a solid polymer acid precursor, for example polylactic acid; the delayed water-swelling particles contain a weighting material, for example selected from silicates, aluminosilicates, barite, hematite, ilmenite, manganese tetraoxide, manganosite, iron, lead, aluminum and combinations of these; the delayed water-swelling particles are formed from particles having an inner core of proppant material with a layer of the delayed water absorbent material formed around the proppant material; the delayed water-swelling particles are formed from superabsorbing polymer particles that are crosslinked at the surface to reduce penetration by water; the superabsorbing polymer particles are further coated with at least one of (1) a layer or layers of water degradable material and (2) a layer or layers of non-water-degradable, non-water absorbing encapsulating material; the slurry is introduced into the wellbore during or subsequent to introduction of a PAD fluid of a fracturing treatment; the carrier fluid of the slurry has a specific gravity that is at least one of greater or less than the specific gravity of the PAD fluid; the slurry contains materials that provide buoyancy of the slurry within the PAD fluid; the buoyancy providing materials include at least one of polymer particles, hollow beads, ceramic materials, porous particles, fibers and foaming agents; the carrier fluid is the PAD fluid; the carrier fluid is immiscible with the PAD fluid; the carrier fluid is miscible with the PAD fluid; and the carrier fluid is at least one of a drilling mud or a completion brine.

Yet another embodiment of the invention, is a method of treating a formation penetrated by a wellbore including the steps of: providing a quantity of particles containing delayed water-swelling particles formed at least in part from a water-swelling material; forming a slurry of the particles with a carrier fluid; and introducing the slurry into the wellbore during or subsequent to introduction of a PAD fluid of a fracturing treatment, in which the carrier fluid of the slurry has a specific gravity that is at least one of greater or less than the specific gravity of the PAD fluid. In various versions of this embodiment: the slurry contains materials that provide buoyancy of the slurry within the PAD fluid; the buoyancy providing materials include at least one of polymer particles, hollow beads, ceramic materials, porous particles, fibers and foaming agents; the carrier fluid is the PAD fluid; the particles include non-water-swelling particles; non-water-swelling particles of at least two different size distributions are used in which the mean particle size of the larger non-water-swelling particles is at least 1.5 times greater than that of the smaller non-water-swelling particles; the non-water-swelling particles include coarse particles having a particle size of from about 0.2 mm to about 2.35 mm and at least one of fine particles having a particle size of less than about 0.1 mm and medium particles having a particle size of from about 0.1 mm to less than about 0.2 mm; the water-swelling material is at least one of a clay and a superabsorbing material; the clay is selected from bentonite, montmorillonite, smectite, nontronite, beidellite, perlite and vermiculite clays and combinations of these, and the superabsorbing material is selected from polymers and copolymers of acrylate, acrylic acid, amide, acrylamide, saccharides, vinyl alcohol, urethane, and combinations of these materials; the delayed water-swelling particles are formed from particles having a core of water-swelling material with a coating of water degradable material; the water degradable material is a solid polymer acid precursor, for example polylactic acid; the delayed water-swelling particles contain a weighting material; the weighting material is selected from silicates, aluminosilicates, barite, hematite, ilmenite, manganese tetraoxide, manganosite, iron, lead, aluminum and combinations of these; the delayed water-swelling particles are formed from particles having an inner core of proppant material with a layer of the delayed water absorbent material formed around the proppant material; the delayed water-swelling particles are formed from superabsorbing polymer particles that are crosslinked at the surface to reduce penetration by water; the superabsorbing polymer particles are further coated with at least one of (1) a layer or layers of water degradable material and (2) a layer or layers of non-water-degradable, non-water absorbing encapsulating material; the carrier fluid is immiscible with the PAD fluid; and the carrier fluid is miscible with the PAD fluid.

A further embodiment of the invention is a method of treating a formation penetrated by a wellbore including the steps of: providing a quantity of delayed water-swelling particles having a core of a water-swelling material in which the core has a coating substantially surrounding the core that temporarily prevents contact of water with the water-swelling material, the coating being formed from at least one of (1) a layer or layers of water degradable material and (2) a layer or layers of non-water-degradable, non-water absorbent encapsulating material; forming a slurry of the particles with a carrier fluid; and introducing the slurry of particles into the wellbore of the formation. In various versions of this embodiment: non-water-swelling particles are provided with the delayed water-swelling particles; the slurry of particles is positioned within a fracture of the formation; the water-swelling material is capable of absorbing at least the water-swelling material's weight of water; the non-water-swelling particles have a particle size of from about 0.035 mm to about 2.35 mm; non-water-swelling particles of at least two different size distributions are used in which the mean particle size of the larger non-water-swelling particles is at least 1.5 times greater than that of the smaller non-water-swelling particles; the non-water-swelling particles include coarse particles having a particle size of from about 0.2 mm to about 2.35 mm and at least one of fine particles having a particle size of less than about 0.1 mm and medium particles having a particle size of from about 0.1 mm to less than about 0.2 mm; the water-swelling material is a superabsorbent material that has been surface cross-linked to further delay swelling; the particles have a specific gravity that is at least one of greater or less than the specific gravity of the carrier fluid; the water-swelling material is at least one of a clay and a superabsorbing material; the clay is selected from bentonite, montmorillonite, smectite, nontronite, beidellite, perlite and vermiculite clays and combinations of these, and the superabsorbing material is selected from polymers and copolymers of acrylate, acrylic acid, amide, acrylamide, saccharides, vinyl alcohol, urethane, and combinations of these materials; the delayed water-swelling particles are formed from particles having a core of water-swelling material with a coating of water degradable material; the water degradable material is a solid polymer acid precursor, for example polylactic acid; the delayed water-swelling particles contain a weighting material; the weighting material is selected from silicates, aluminosilicates, barite, hematite, ilmenite, manganese tetraoxide, manganosite, iron, lead, aluminum and combinations of these; the delayed water-swelling particles are formed from particles having an inner core of proppant material with a layer of the delayed water absorbent material formed around the proppant material; the delayed water-swelling particles are formed from superabsorbing polymer particles that are crosslinked at the surface to reduce penetration by water; the slurry is introduced into the wellbore during or subsequent to introduction of a PAD fluid of a fracturing treatment; the carrier fluid of the slurry has a specific gravity that is at least one of greater or less than the specific gravity of the PAD fluid; the slurry contains materials that provide buoyancy of the slurry within the PAD fluid; the buoyancy providing materials include at least one of polymer particles, hollow beads, ceramic materials, porous particles, fibers and foaming agents; the carrier fluid is the PAD fluid; the carrier fluid is immiscible with the PAD fluid; the carrier fluid is miscible with the PAD fluid; and the carrier fluid is at least one of a drilling mud or a completion brine.

Yet a further embodiment of the invention is a method of treating a subterranean formation immediately surrounding a wellbore penetrating the formation to reduce lost fluid circulation during drilling operations including the steps of: providing a quantity of particles containing delayed water-swelling particles formed at least in part from a water-swelling material; forming a slurry of the particles with a carrier fluid; and introducing the slurry into the wellbore at a pressure sufficient to fracture a portion of the formation. In various aspects of this embodiment: the carrier fluid is at least one of a drilling mud or a completion brine; the delayed water-swelling particles are superabsorbing particles in a carrier fluid of one of a non-aqueous fluid, an emulsion and an aqueous metal salt solution that delays absorption of water; the particles also include non-water-swelling particles; non-water-swelling particles of at least two different size distributions are used in which the mean particle size of the larger non-water-swelling particles is at least 1.5 times greater than that of the smaller non-water-swelling particles; the non-water-swelling particles include coarse particles having a particle size of from about 0.2 mm to about 2.35 mm and at least one of fine particles having a particle size of less than about 0.1 mm and medium particles having a particle size of from about 0.1 mm to less than about 0.2 mm; the water-swelling material is at least one of a clay and a superabsorbing material; the clay is selected from bentonite, montmorillonite, smectite, nontronite, beidellite, perlite and vermiculite clays and combinations of these, and the superabsorbing material is selected from polymers and copolymers of acrylate, acrylic acid, amide, acrylamide, saccharides, vinyl alcohol, urethane, and combinations of these materials; the delayed water-swelling particles are formed from particles having a core of water-swelling material with a coating of water degradable material; the water degradable material is a solid polymer acid precursor, for example polylactic acid; the delayed water-swelling particles are formed from particles having an inner core of proppant material with a layer of the delayed water absorbent material formed around the proppant material; the delayed water-swelling particles are formed from superabsorbing polymer particles that are crosslinked at the surface to reduce penetration by water; the method further includes circulating a drilling fluid within the wellbore during drilling after introduction of the slurry; the method further includes introducing a cement into the wellbore after introduction of the slurry; and the method further includes introducing a further well treatment fluid into the wellbore after introduction of the slurry.

A further embodiment of the invention is a method of positioning materials in a formation penetrated by a wellbore containing the steps of: providing a quantity of particles; forming a slurry of the particles with a carrier fluid; introducing the slurry of particles into the wellbore of the formation; and introducing a second fluid into the wellbore of the formation prior to or subsequent to the slurry, in which the carrier fluid of the slurry has a specific gravity that is at least one of greater or less than the specific gravity of the second fluid. In variations of this embodiment: the slurry contains materials that provide buoyancy of the slurry within the second fluid; the buoyancy providing materials include at least one of polymer particles, hollow beads, ceramic materials, porous particles, fibers and foaming agents; the carrier fluid is immiscible with the second fluid; and the carrier fluid is miscible with the second fluid.

BRIEF DESCRIPTION OF THE DRAWINGS

For a more complete understanding of the present invention, reference is now made to the following description taken in conjunction with the accompanying figures, in which.

DETAILED DESCRIPTION

Delayed water-swelling materials can be prepared from particles having a core containing a water-swelling material that is surrounded by a coating that temporarily prevents contact of water with the water-swelling material. The water-swelling material may be capable of absorbing at least the water-swelling material's weight of water. In particular, the water-swelling material may be capable of absorbing from at least about one to 600 hundred times the water-swelling material's weight of water, more particularly from about 10 to about 400 times the water-swelling material's weight of water, and still more particularly from about 40 to about 200 times the water-swelling material's weight of water.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Of particular use for the water-swelling materials are superabsorbing materials. Superabsorbing materials are formed from polymers that are water soluble but that have been internally crosslinked into a polymer network to an extent that they are no longer water soluble. Such materials have the tendency to swell or absorb water. Examples of superabsorbing materials are described in U.S. Pat. Nos. 4,548,847; 4,725,628 and 6,841,229 and in U.S. Patent Application Publication Nos. US2002/0039869A1 and US2006/0086501A1, each of which is herein incorporated by reference in its entirety. Non-limiting examples of superabsorbing materials include crosslinked polymers and copolymers of acrylate, acrylic acid, amide, acrylamide, saccharides, vinyl alcohol, water-absorbent cellulose, urethane, and combinations of these materials. Particles of the superabsorbing material may have an unswollen particle size of from about 50 microns to about 1 mm or more.

Other water-swelling materials that are not superabsorbent materials as defined above may also be used. These may include natural water-swelling materials such as water-swelling clays. Non-limiting examples of water-swelling clay materials include bentonite, montmorillonite, smectite, nontronite, beidellite, perlite and vermiculite clays and combinations of these. Such non-superabsorbent, water-swelling materials may have an unswollen particle size of from about 50 microns to about 1 mm or more, but typically less than 2 mm.

The water-swelling materials may be used to form a composite core wherein the water-swelling materials are combined with other materials. These may include weighting agents to adjust the specific gravity of the material. Examples of weighting agents may include, but are not limited to, silicates, aluminosilicates, barite, hematite, ilmenite, manganese tetraoxide (such as that available commercially as Micromax from Elkem, Oslo, Norway), manganosite, iron, lead, aluminum and other metals. Bentonite is particularly useful as the water-swelling material when used in combination with these weighting materials. The weighting agents may be used in an amount of from 0 to about 70% by weight of the composite particle. For certain applications binders may be used with the weighting agents. Examples of binder materials include thermoplastic materials, such as polystyrene, polyethylene, polymethylmethacrylate, polycarbonate, polyvinylchloride, etc. The binder materials may also include thermosetting materials, such as phenol-formaldehyde, polyester, epoxy, carbamide and other resins. Waxes may also be used as a binder material. The amount of binder used may be just enough to provide a coating so that the materials adhere together.

Other core materials may include proppants wherein the proppant constitutes an inner core and the water-swelling material forms an outer layer that surrounds the proppant. Such coated proppants have mechanical strength as well as swelling capacity. Examples of proppant materials include ceramic, glass, sand, bauxite, inorganic oxides (e.g. aluminum oxide, zirconium oxide, silicon dioxide, bauxite), etc. The coated proppant may be prepared by immersing the proppant into a solution or emulsion of the superabsorbant material and allowing the solvent to evaporate. Heating may be used to evaporate the solvents. Typical drying temperatures may be from about 110° C. to about 150° C. The solvents may be aprotic organic solvents, such as hexanes, heptanes and other saturated and unsaturated hydrocarbons. The coating thickness can be varied by adjusting the coating time and/or concentration of the dissolved superabsorbent.

The above-described method of coating proppant may have particular application to proppant materials of smaller size such as from about 0.3 mm to about 1 mm. Larger proppant sizes of from 1 mm or greater may be coated with dry superabsorbants. In such instances, the proppant particles may be immersed in a binder solution and the particles, being wet, are crumbed in milled (typically less than 200 micron) superabsorbent powder, which sticks to the proppant particle surface. The particles are then allowed to dry so that the proppant particles are covered with the superabsorbent powder.

For non-superabsorbing water-swelling materials, the water-swelling material coating may be applied in a fluidized bed coating procedure.

To provide delayed swelling of the water-swelling materials, the water-swelling material particle core, including composite water-swelling particle cores such as those that include weighting agents and/or proppant materials, may be provided with a coating or coatings that temporarily prevent contact of the water-swelling material with water or aqueous fluids when subjected thereto. The coating may be formed from a water degradable material that eventually degrades in the presence of water. As used herein, the expression "water degradable" or similar expression is meant to encompass the characteristic of the material to decompose, such as by dissolution, hydrolyzing, depolymerization, breaking apart of chemical bonds, and the like, upon exposure to water under selected conditions such that the material fails as a barrier.

An encapsulating layer may also be used. As used herein, the term "encapsulating" when used in describing the coating materials or layers is meant to be distinguished from the water degradable material coatings in that the encapsulating material is non-water-degradable or may have only limited degradability in water so that the encapsulating coating must be mechanically broken or removed or which may be degradable primarily in oil (non-water) to allow contact of the water-swelling material with water. As used herein, the encapsulating material does not include mineral oxide (e.g. silica, aluminum) materials or resins or other materials that degrade primarily in response to downhole temperature conditions.

Of particular use for the water degradable materials are solid polymer acid precursors. These are solid polymers or oligomers of certain organic acids that hydrolyze or depolymerize under known and controllable conditions of temperature, time and pH to form their monomeric organic acids. As used herein, these materials are referred to as "solid polymer acid precursors." These materials are typically solids at room temperature.

One example of a suitable solid acid-precursor is the solid cyclic dimer of lactic acid (known as "lactide"), which has a melting point of 95° C. to 125° C., (depending upon the optical activity). Another is the polymer of lactic acid, (sometimes called a polylactic acid (or "PLA"), or a polylactate, or a polylactide). Another example is the polymer of glycolic acid (hydroxyacetic acid), also known as polyglycolic acid ("PGA"), or polyglycolide. Another example is the solid cyclic dimer of glycolic acid (known as "glycolide"), which has a melting point of about 86° C. Other materials suitable as solid acid-precursors are all those polymers of glycolic acid with itself or other hydroxy acids, such as are described in U.S. Pat. Nos. 4,848,467; 4,957,165; and 4,986,355, each of which is herein incorporated by reference in its entirety.

Many of these polymers are essentially linear. The degree of polymerization of the linear polylactic acid can vary from a few units (e.g. 2-10) (oligomers) to several thousands (e.g. 2000-5000). The polymers may also include some cyclic structures, including cyclic dimers. In general, the degree of polymerization of these cyclic structures is smaller than that of the linear polymers.

These solid polymer acid precursors may be homopolymers, copolymers, and block copolymers of the above-described materials. As used herein, "homopolymer(s)" may contain less than about 0.1% by weight of other comonomers. As used with reference to polylactic acid, "homopolymer(s)" is meant to include polymers of pure D-lactic acid, pure L-lactic acid and/or mixtures or copolymers of pure D-lactic acid and pure L-lactic acid. As used herein, "copolymer(s)" may refer to both copolymers and block copolymers. Combinations or mixtures of the above-described homopolymers and/or copolymers may also be used.

Other examples of polyesters of hydroxycarboxylic acids that can be used as solid polymer acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones can also be used.

Polyesters obtained by esterification of other hydroxyl containing acid containing monomers such as hydroxyaminoacids can also be used as the solid polymer acid precursors. Common aminoacids are L-aminoacids. Among the most common aminoacids the three that contain hydroxyl groups are L-serine, L-threonine, and L-tyrosine. These aminoacids can be polymerized to yield polyesters at the appropriate temperature and using appropriate catalysts by reaction of their alcohol and their carboxylic acid group.

A general structure for the above-described homopolyesters is:

$$H-\{O-[C(R1,R2)]_x-[C(R3,R4)]_y-C=O\}_z-OH \quad (1)$$

where,

R1, R2, R3, R4 is either H, linear alkyl, such as $CH_3$, $CH_2CH_3$ $(CH_2)_nCH_3$, branched alkyl, aryl, alkylaryl, or a functional alkyl group (bearing carboxylic acid groups, amino groups, hydroxyl groups, thiol groups, or others), x is an integer between 1 and 11, y is an integer between 0 and 10, and z is an integer between 2 and 50,000.

NatureWorks LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. Those available from NatureWorks LLC typically have crystalline melt temperatures of from about 120° C. to about 170° C., but others are obtainable. Poly(d,l-lactide) is available from Bio-Invigor, Beijing and Taiwan, with weight average molecular weights of up to 500,000. Polylactide products, such as poly(l-lactide), of even higher weight average molecular weights are also available. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form.

The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. Some of the polymers dissolve very slowly in water before they hydrolyze. (The naturally occurring L-lactide forms partially crystalline polymers; synthetic D/L-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

To coat the particle core containing the water-swelling material, the solid polymer acid precursor may be physically dissolved in an organic solvent. Solvents that may be suitable for physically dissolving the solid polymer acid precursors include, but are not limited to, alcohols, ketones, esters, ethers, and combinations of these. Examples of suitable solvents include acetone, ethylacetate, butylacetate, toluene, dibasic esters, light petroleum distillates, ethanol, isopropanol, acetonitrile and combinations of these.

By immersing the particle core containing the water-swelling material in a solution of the dissolved solid polymer acid precursor and allowing the solvent to evaporate, a coating of the solid polymer acid precursor can be formed that surrounds the particle core. The thickness of the coating can be varied by adjusting the coating agent concentration in the immersion solution. The coating may also be applied in a fluidized bed wherein the coating thickness is varied by adjusting exposure time and concentration.

Additionally, several layers of the solid polymer acid precursor coating may be applied by this technique. This may be accomplished by providing a protective layer to a previously applied coating to prevent the coating's dissolution during recurring immersion of the particle into solution of the solid polymer acid precursor. The protective material may be an oil, plastificator or viscous solvent that does not dissolve the coating material or dissolves it very slowly. Examples of such materials may include glycerin, ethyleneglycol, organic oils, silicones, esters of phthalic acid and combinations of these. To protect the previously applied coating it is enough to treat the particles with the protective material between the repeating of the immersion coating of the particle as previously described. This may be carried out any number of times to provide the desired thickness of the coating.

The degree of delay in swelling provided by the coating for the particles can be determined by performing simple tests using water or fluids under conditions that simulate those that are expected to be encountered in the particular application or treatment for which the particles are to be used. The delayed water-swelling particles can be tailored with a sufficient coating or treatment to provide the desired degree of delay in swelling based upon these tests.

The water-swelling core material may also be encapsulated by a non-water-degradable, non-water absorbing coating that can be removed mechanically or broken. Examples of suitable encapsulating materials may include natural gums (e.g. gum acacia, gum arabic, locust bean gum); polysaccharides such as modified starches (e.g. starch ethers and esters, and enzyme-treated starches) or cellulose compounds (e.g. hydroxymethylcellulose or carboxymethylcellulose); polysaccharides; proteins, such as casein, gelatin, soy protein and gluten, and synthetic film-forming agents, such as polyvinyl alcohol, polyvinyl pyrrolidone, carboxylated styrene, non-water absorbent polyvinyl alcohol, polyvinyl pyrrolidone, polyvinylidene chloride, and mixtures of these. These and other suitable encapsulating materials may include those that are described in U.S. Pat. Nos. 3,952,741; 3,983,254; 4,506,734; 4,658,861; 4,670,166; 4,713,251; 4,741,401; 4,770,796; 4,772,477; 4,933,190; 4,978,537; 5,110,486; 5,164,099; 5,373,901; 5,505,740; 5,716,923; 5,910,322 and 5,948,735, each of which is incorporated herein by reference. Carbon-based polymers may also be used as an encapsulating material. These protective materials may be broken upon fracture closing or other mechanisms that cause breakage of the coating.

In another embodiment, delayed water-swelling particles can be formed by restricting the mobility of the polymer chains at the surface of the superabsorbing particles. This is accomplished by surface crosslinking the polymer particles with a crosslinking agent. Known crosslinking agents include metal salts or complexes, particularly those that are transition metal based. Further crosslinking of polymer chains in the surface of the superabsorbent granule may be accomplished by refluxing the superabsorbing particle in an alcohol (such as isopropanol) solution of a transition metal complex; in particular complexes of zirconium and titanium may be used. The crosslinking surface treatment delays water penetration into the body of the water-swelling particle.

In certain applications, the delayed water-swelling particles may be provided by methods other than through the use of surface coatings or treatment. These may include the use of a non-aqueous carrier fluid or emulsions wherein the water-swelling material is carried in the oil phase of an oil and water emulsion, which may be an oil-in-water or water-in-oil emulsion. Additionally, the use of aqueous metal salt solutions, such as halogenides of alkali and alkali-earth metals (e.g. sodium chloride) with the superabsorbing materials is known to delay the swelling of the superabsorbing material.

Combinations of the above-described methods for delaying swelling of the water-swelling material may be used. For example, superabsorbing materials that have undergone surface crosslinking may be coated with a coating or coatings of water degradable materials or non-water-degradable encapsulating materials or both. Water-swelling materials may be coated with coatings of water degradable materials and non-water-degradable encapsulating materials. These materials may be used in non-aqueous carriers or in the oil phase of an oil and water emulsion.

The above-described delayed water-swelling particles may be used alone or in combination with other materials for various applications. The delayed water-swelling particles may be of various shapes and sizes, which may be dependent upon the particular application for which they are used.

The delayed water-swelling particles have particular application in the treatment of subterranean formations such as those formations of oil and gas wells. The delayed water-swelling particles may be used in combination with other particles. These may include inert, non-water-swelling particles that may be non-malleable particles such as ceramic, glass, sand, bauxite, inorganic oxides (e.g. aluminum oxide, zirconium oxide, silicon dioxide, bauxite), etc.

In particular applications, the delayed water-swelling particles may be used in combination with non-water-swelling particles of different size distributions. The use of such particles of different size distributions to reduce formation permeability is described in U.S. Pat. No. 7,004,255 to Boney, entitled "Fracture Plugging," and which is herein incorporated by reference in its entirety. As described therein, particles of different size distributions are used in combination to fill a fracture. It is well known that a region filled with regularly arranged spheres of equal size will have a void volume of about 36%. Furthermore, if a second set of equal-sized spheres that are about one tenth the size of the first set are included, the smaller spheres will tend to reside in the voids between the larger spheres, and the resulting void volume will be about 23%. Finally, if a third set of equal-sized spheres that are about one tenth the size of the second set are included, the final void volume will be about 15%.

In the present invention, the different sized non-water-swelling particles may have a particle size of from about 0.035 mm to about 2.35 mm or more. The non-water-swelling particles may have a particle size distribution wherein the mean particle size of the larger non-water-swelling particles is at least about 1.5 times greater than that of the smaller non-water-swelling particles. The non-water-swelling particles of different sizes may include "coarse" particles having a particle size of from about 0.2 mm to about 2.35 mm, "medium" particles having a particle size of from about 0.1 mm to less than about 0.2 mm and "fine" particles having a particle size of less than about 0.1 mm. If two sizes are used instead of three, they could be "coarse" and "medium," "medium" and "fine", or "coarse" and "fine." Although the ranges of the definitions of "coarse", "medium" and "fine" have been given as contiguous, the actual sizes used may not be contiguous. For example, although the coarse particles may be from about 0.2 mm to approximately 2.35 mm and medium particles may be from about 0.1 mm to about 0.2 mm in diameter, actual sizes used in a treatment might be about 1 to about 2 mm and about 0.1 to about 0.2 mm, respectively. Additionally, different size distributions of particle sizes within each of the coarse, medium and fine particle sizes may also be used.

A mixture of non-water-swelling particles of from about 30 to about 95% by total weight of non-water-swelling particles of the coarse particles, 0 to about 30% by total weight of non-water-swelling particles of the medium particles, and 0 to about 20% by total weight of non-water-swelling particles of the fine particles may be suitable in many applications. These guidelines are generally accurate for the normal situation in which the particles are not perfect spheres, are not uniform in size, and are not perfectly packed.

The delayed water-swelling particles may be used in combination with the non-water-swelling particles in an amount of from about 0.5% to about 50% or more by total weight of particles. The delayed water-swelling particles may be premixed with the non-water-swelling particles or may be added separately.

In certain applications utilizing encapsulated water-swelling materials, the particle size of the unswollen water-swelling particles may be the same or within the same range as the largest non-water-swelling particles. This facilitates the most efficient mechanical release, as smaller water-swelling particles may tend to pack in the interstitial space between the large non-water-swelling particles so that the encapsulating layer is never broken. In other applications, such as in drilling applications, where an encapsulating layer is not used, the water-swelling particles may be smaller than the largest non-water swelling materials.

In hydraulic fracturing of subterranean formations of oil or gas wells, the delayed water-swelling particles may be used alone or in combination with non-water-swelling particles to treat the upper and/or lower boundaries of the fracture where insufficient stress barriers may result in vertical fracture growth or where the fracture grows into adjacent water or undesirable gas bearing zones. The non-water-swelling proppant particles and water-swelling particles create mechanically sound barriers that are able to isolate upper and lower zones from pressure developed in the fracture during treatment, with the water-swelling materials eventually sealing the pore spaces between the non-water-swelling particles, thus creating an impermeable artificial barrier.

To create artificial barriers that prevent fracture growth into undesirable areas, the particles may be added to the fracturing fluid and pumped into the fracture during the hydraulic fracturing treatment. The mixture may be pumped at the beginning of the treatment in the PAD or immediately after the PAD and prior to the main proppant stages.

The particles are added to a carrier fluid to form a slurry. The particles may have a density that is the same, higher or lower than that of the carrier fluid. Because delayed water-swelling particles are used, aqueous or water-based fluids may be used as the carrier fluid. The carrier fluid may be any fluid having properties that allow the particulate materials to be transported therein. It can be the same fluid as that employed as the PAD fracturing fluid. Examples of suitable carrier fluids may include water, oil, viscosified water (such as water based guar, modified guar gel crosslinked with borate or organometallic compounds, or water viscosified with a viscoelastic surfactant that forms micelles), viscosified oil, emulsions, energized fluids (for example with nitrogen or $CO_2$ gas) and slick water (water containing a small amount of polymer or viscoelastic surfactant that serves primarily as a friction reducer rather than primarily as a viscosifier).

In certain applications, such as drilling applications, other materials may be present in the carrier fluid. These may include such materials as xanthan gum, whelan gum, scleroglucan, etc., as viscosifiers, as well as bentonite in aqueous solutions. If a non-aqueous carrier fluid is used, viscosifiers may include organophillic clays and phosphate esters.

Depending upon the desired area of placement of the particles, the properties of the particles and the carrier fluid may be varied. The carrier fluid may be miscible or immiscible with the PAD fluid or other treatment fluids with which it is used. The carrier fluid may have the same or substantially the same density as the PAD or other treating fluid. The density of the carrier fluid may also be adjusted so that its specific gravity is greater or less than that of the PAD fracturing fluid or other treating fluid. In this way, the particles can be placed along upper and lower boundaries of the fracture. Carrier fluids with higher specific gravities than the PAD fluid will tend to finger or slump along with the carried solids through the PAD fluid due to gravity driven convection fluid flow so that the slurry is placed at the bottom of the fracture. The properties of the carrier fluid may be modified through the use of gelling agents, pH adjustors or the addition of breakers to provide the desired characteristics. For example, for some crosslinkers, lower pH eases carrier fluid fingering through the PAD. Density can also be adjusted with weighing agents, as discussed previously.

Similarly, carrier fluids with lower specific gravities than the PAD fluid may be used. Fluids with lower densities may include light fractions of oil. Carrier fluids with lower specific gravities may also be provided by the inclusion of lightweight materials or particles within the carrier fluid. These may include such substances as light-weight ceramic materials, hollow beads, porous particles, fibers and/or foaming agents, polymer particles (e.g. polypropylene particles, which are commercially available with densities of less than 1 g/cm$^3$), etc. Due to the difference in densities, the carrier fluid containing the delayed water-swelling particles, with or without non-water-swelling proppant particles, will be buoyant in the PAD fluid and will rise to the upper portion of the fracture.

If it is necessary that the carrier fluid be of a lower viscosity than is sufficient for a safe placement of the delayed water-swelling mixture, fibers may be added. These may be formed from carbon- or silicon-based polymers. The fibers facilitate suspending of the particles in the carrier fluid and have a negligible effect on the proppant pack permeability after the fracture closes. The concentration and nature of the fibers may be tailored to both assist particle suspension and to form a less permeable barrier along the lower and/or upper boundary of the fracture.

The delayed water-swelling particles with or without non-water-swelling particles of the same or of different size distributions, as has been described, may be placed along the upper and lower boundaries of the fracture. Such mixture is pumped during or right after the PAD treatment. The carrier fluid/particle mixture may be pumped in separate stages, with the higher specific gravity carrier fluid mixture being pumped prior to or after the lower specific gravity mixture. The delayed water-swelling particles, including those composite particles that contain weighting agents and the like, may be placed by radial flow that is induced in the fracture early in the treatment and carries the delayed water-swelling particles and other particles of the mixture in both upward and downward directions. Particles are bridged in the lower and upper extremities of the fracture. The proppants or non-water-swelling particles provide dense mechanically stable barriers. Once in place, the aqueous carrier fluid or water from water producing zones eventually causes the water-swelling material of the particles to swell, providing further reductions in permeability and rendering additional isolation properties. Because swelling of the water-swelling particles is delayed, preliminary swelling is avoided thus facilitating placement of the particle mixture within the extremities of the formation.

Following treatment of the formation with the artificial bridging material formed by the delayed water-swelling particles and/or mixtures, further PAD fluid may be pumped to provide further fracturing of the formation, with the bridging material preventing fracturing in non-producing zones. Alternatively, the treatment may continue with proppant loading in a conventional manner. The use of the delayed water-swelling particle materials and mixtures does not require any changes in the main fracture treatment design and the fracturing job can be conducted in a normal manner.

In another application, the delayed water-swelling particles, with or without non-water-swelling particles of the same or different size distributions, may be used in drilling operations with drilling mud, in completion brines or in treating areas of the formation immediately surrounding the wellbore. As was discussed previously, in high permeable formations, such as sandstone, fluid loss in fractures formed during drilling operations, which are typically much narrower than those formed in hydraulic fracturing, causes the drilling mud within the fracture to eventually dehydrate so that the fracture is blocked by the mud particles and additives and there is no pressure transmitted to the tip of the fracture and therefore no further fracture growth. In shale and other low permeable formations, there is limited or no fluid lost from the drilling fluid so that the fracture tends to propagate.

By using the delayed water-swelling materials during drilling operations in shale or other low permeability formations, the same effect can be achieved. The delayed water-swelling particles may be used in combination with proppant of the same or different sizes, as has been discussed. The proppant particles used in drilling operations may include calcium carbonate or sand particles of the same or different size distributions. Other particulate materials, such as carbon and graphite materials, may be used. These may include those available commercially as G-SEAL and G-SEAL-PLUS materials, from M-I Swaco, Houston, Tex., U.S.A., and angular resilient carbon materials, as described in U.S. Pat. No. 7,066,285, and which may be available commercially as STEELSEAL materials, from Halliburton Energy Services, Inc., Houston, Tex., U.S.A.

For drilling applications, particle sizes may tend to be smaller, however, than those used in fracturing. In drilling applications, particle sizes ranging from about 100 microns to about 1000 microns, more particularly from about 100 microns to about 500 microns, may be used. The particle mixture may be added to a portion of the drilling mud or as a pill. Fractures adjacent to the wellbore will be propped open and the water-swelling material will absorb water as the mud flows along the fracture, eventually dehydrating the drilling mud so that the fracture is blocked off, providing a "stress cage" around the wellbore in these areas and thus preventing further fracturing. This increases or widens the mud weight window that may be used in drilling operations. This method may also be used in high permeability formations, as well, to reduce fracture growth in high permeability formations.

In certain situations, the formation may be fractured deliberately during drilling or in other operations. The particle slurry may be introduced at a sufficient pressure to form fractures intentionally in portions of the formation immediately surrounding the wellbore. These fractures may be propped open with the materials described to increase the hoop strength around the wellbore, which allows, if necessary, the mud weight to be increased to control the formation or formation pore pressure later in the drilling process without re-fracturing the zone that has been treated. This may allow drilling to proceed further before running casing. Additionally, the treatment may facilitate cementing operations and other subsequent treatment, with the water-swelling particle treatment occurring just prior to cementing, or other treatments wherein fluids are introduced into the wellbore.

In drilling applications, the delayed water-swelling material formed from encapsulating coatings that must be removed mechanically may not be desirable due to the stresses such coated particles may encounter during the drilling operations, which may prematurely break or remove the encapsulating coating. Those other methods described previously for providing a delayed water swelling may be used, however. If treatment occurs as a pill, the water-swelling particles may be carried in a non-aqueous carrier or a highly saline aqueous fluid that delays swelling of the superabsorbing particles.

The following examples serve to further illustrate the invention:

EXAMPLES

Example 1

The influence of delayed water swelling particles on the permeability of a sand pack was evaluated. Superabsorbing particles in the form of partially crosslinked polyacrylate polymer particles having a particle size of 0.2 to 1 mm, with an ability to absorb up to 500 times their weight of water, marketed as AQUASORB 3995 KM, available from Hercules Incorporated, Wilmington, Del., U.S.A., were coated with a coating of PLA. The PLA coating was applied in an amount of approximately 25-35 wt. % of the coated superabsorbing particle. The coating was applied by immersion of the superabsorbent particle in a solution of the dissolved PLA.

The superabsorbing particles with the PLA coating were used in combination with 20/40 mesh (0.84 mm/0.42 mm) sand. The coated superabsorbing particles were used in an amount of 2.5% by total weight of the mixture. Permeability was measured on a conductivity apparatus at 90° C. in a cell pressurized to approximately 4000 psi (27.6×10³ kPa) using a 2 wt. % KCl brine solution at three different flow rates of 0.5 mL/min, 1 mL/min and 1.5 mL/min. The conductivity apparatus consisted of a 200,000 lbf (890 kN) load press with automated hydraulic intensifiers and a modified Hastelloy API conductivity cell with a 10 in² (64.5 cm²) flow path. The apparatus was capable of attaining a maximum closure stress of 200,000 psi (1.38×10⁶ kPa) and a maximum temperature of 350° F. (177° C.). The temperature of the conductivity cell was controlled by electrically heated platens in contact with the sides of the cell. Rosemount pressure transducers were used to measure the pressure drop across the length of the fracture. A Mitutoyo digital caliper was used to measure the fracture gap width. Quizix chromatography pumps were used to pump the brine through the cell during flowback and conductivity measurements. The pumps drew nitrogen-sparged 2 wt % KCl brine from a 2 gallon (7.57 L) flowback reservoir. The brine was nitrogen sparged to prevent the introduction of metal oxides into the proppant pack. Before the brine entered the conductivity cell, it was passed through a reservoir simulator and a silica saturation system.

As a baseline, the permeability of a sand pack without the water-swelling particles was determined at room temperature. A sand pack containing the 2.5% by weight of the delayed superabsorbent material was measured after approximately 30 minutes, 4 hours and 23 hours. The results are presented in Table 1 below.

TABLE 1

| Test | Time of test, hr:min | Conductivity (mDft) | Permeability (Darcy) | Fracture Width (mm) | Temp (° C.) |
|---|---|---|---|---|---|
| Sand 20/40-mesh | 0:30 | 2617 | 147 | 5.43 | 26 |
| | 4:50 | 2193 | 123 | 5.43 | 26 |
| | 23:10 | 2078 | 117 | 5.42 | 94 |
| Sand 20/40-mesh + 2.5 wt % | 0:45 | 369 | 20 | 5.53 | 26 |
| Delayed | 4:32 | 1.07 | 0.0622 | 5.24 | 94 |
| Superabsorbent | 23:20 | 1.00 | 0.0587 | 5.21 | 89 |

Figure 1:
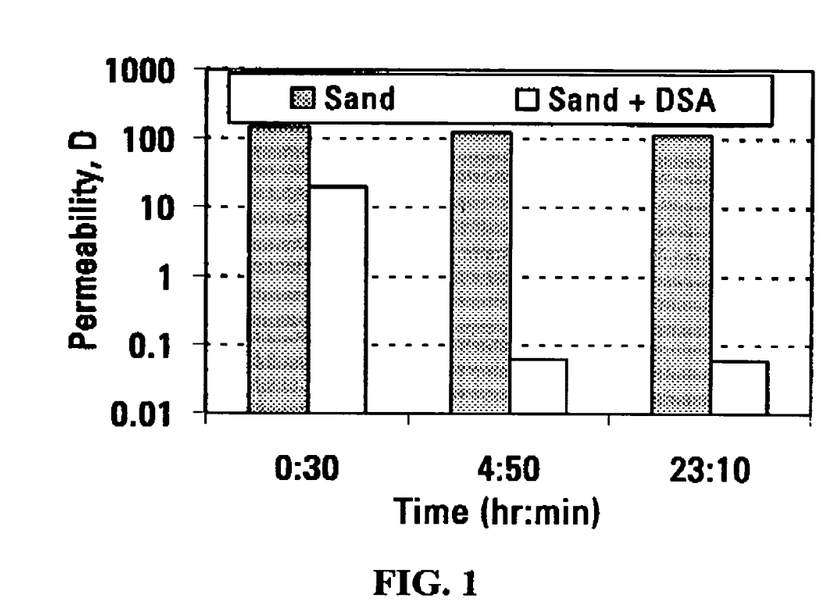
FIG. 1 is a graph showing permeabilities of sand and a sand/delayed superabsorbent mixture over time.

FIG. 1 shows the average permeability at the three different flow rates from Example 1. The average permeability of the sand pack using delayed superabsorbent was approximately 7 times less than that of the baseline sand pack. After over four hours, the average permeability dropped to approximately 0.05% of that of the baseline permeability. After over 23 hours, a modest decrease of 6% in average permeability was observed from that obtained at four hours.

Example 2

Figure 2:
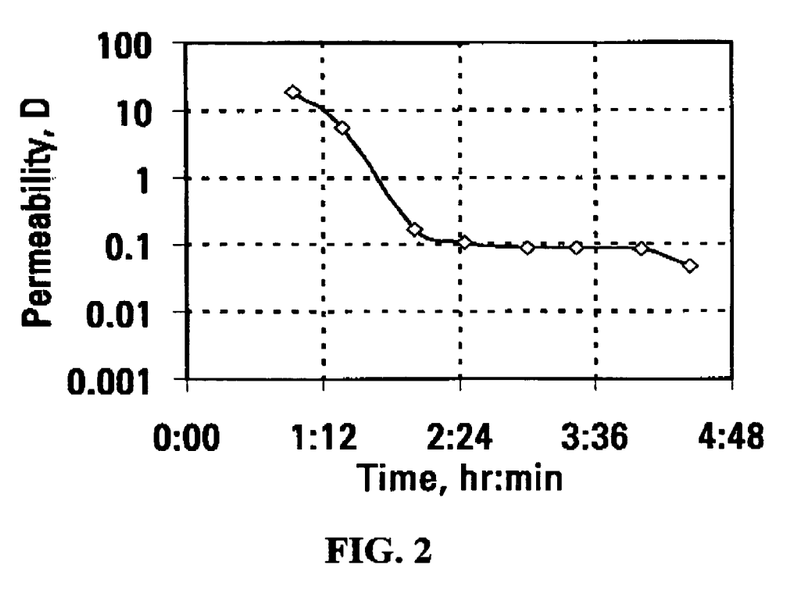
FIG. 2 is a plot of permeability for a sand/delayed superabsorbent mixture over time at constant fluid flow rate.

A sand pack having the second composition of Example 1 (20/40-mesh sand plus 2.5 wt % Delayed Superabsorbent) was tested at approximately 90° C. and approximately 4000 psi (27.6×10³ kPa) using a constant flow rate of 2 wt % KCl brine at 1 mL/min. The results are presented in Table 2 below and in FIG. 2. As can be seen in FIG. 2, permeability leveled off after approximately 2 hours.

TABLE 2

| Time (hr:min) | Flow Rate (ml/min) | Temp (° C.) | Fracture Width (mm) | Viscosity (cP) | dP (kPa) | Conductivity (mDft) | Permeability (Darcy) |
|---|---|---|---|---|---|---|---|
| 0:56:00 | 3 | 26 | 5.385 | 0.8704 | 1.4661 | 328.8779 | 18.6150 |
| 1:22:00 | 3 | 41 | 5.385 | 0.6465 | 3.7107 | 96.5508 | 5.4649 |
| 2:00:00 | 1 | 67 | 5.385 | 0.4286 | 26.1941 | 3.0216 | 0.1710 |
| 2:26:00 | 1 | 79 | 5.385 | 0.3663 | 36.1432 | 1.8712 | 0.1059 |
| 3:00:00 | 1 | 87 | 5.385 | 0.3328 | 38.8057 | 1.5839 | 0.0897 |
| 3:26:00 | 1 | 87 | 5.385 | 0.3328 | 38.1529 | 1.5449 | 0.0874 |

TABLE 2-continued

| Time (hr:min) | Flow Rate (ml/min) | Temp (°C.) | Fracture Width (mm) | Viscosity (cP) | dP (kPa) | Conductivity (mDft) | Permeability (Darcy) |
|---|---|---|---|---|---|---|---|
| 4:00:00 | 1 | 93 | 5.385 | 0.3110 | 37.5781 | 1.5280 | 0.0865 |
| 4:26:00 | 1 | 94 | 5.385 | 0.3076 | 69.0800 | 0.8221 | 0.0465 |

Example 3

Delayed water-swelling particles using bentonite as the water-swelling material were evaluated. The bentonite was combined with a weighting agent of barite or hematite. The bentonite composite particles were prepared according to the following procedure: To a dry mixture of 80 wt % bentonite and 20 wt % of barite or hematite, a 3 wt % solution of polyethylene in heptane heated to 85° C. was added with stirring until a dense mixture was formed. The obtained mixture was placed into a syringe and extruded into cylindrical particles, which were dried for 4-8 hours. The cylindrical particles were 2 mm in diameter and 4-7 mm in length. The cylindrical particles were coated with PLA. The PLA coating was applied in an amount of approximately 25-35 wt. % of the composite particle. The coating was applied by immersion of the particle in a solution of the dissolved PLA.

A mixture of 20/40 mesh (0.84 mm/0.42 mm) sand and the PLA coated bentonite particles was tested in a ½ inch (1.27 cm) Hassler sleeve-type conductivity apparatus at 1500 psi ($10.3 \times 10^3$ kPa) confining pressure. The sample was packed in a Hassler sleeve that utilized a soft Tygon® PVC tube with a length of 0.57-0.60 m and an inner diameter of ½ inch (1.27 cm). The soft sleeve was placed in a steel tube with an inner diameter of ⅞ inch (2.22 cm) and outer diameter of 1 inch (2.54 cm). A chromatographic pump was used to create confining stress by pumping pure water inside the steel tube. The maximum confining stress that could be used with the tube was 3,100 psi ($21.3 \times 10^3$ kPa). Another pump was used to create a flow of brine. Pressure gauges at either end of the device measured differential pressure drop. The maximum pressure drop was limited to the gauge pressure range of 300 psi (2070 kPa). The distance between the pressure ports was 0.466 m. Measurements were conducted at room temperature.

Figure 3:
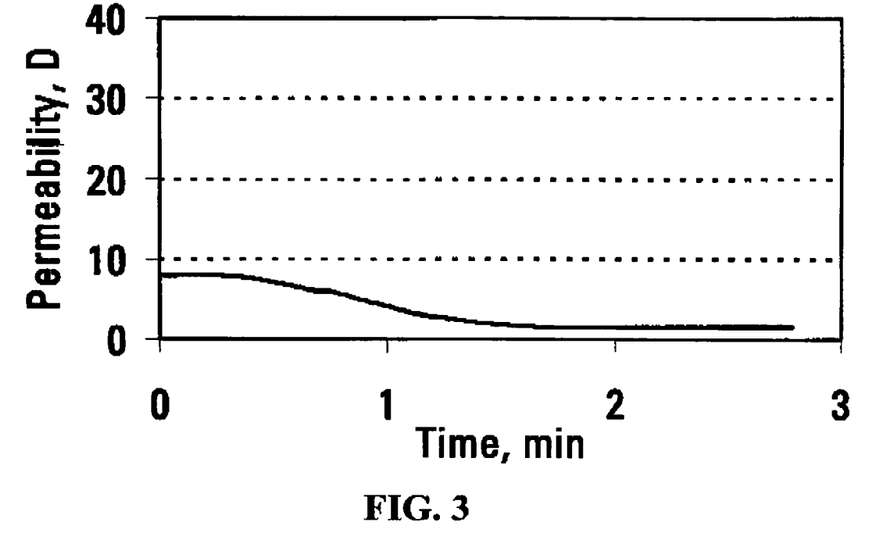
FIG. 3 is plot of permeability for a sand/delayed bentonite composite mixture over time at a constant fluid flow rate.

The coated bentonite particles were used in an amount of 21.5% by total weight of the particle mixture. Brine (2 wt % KCl, 400 ppm $Ca^{2+}$) was pumped at a flow rate of about 5 ml/min. The permeability of the composite bentonite/sand pack was measured at room temperature and provided a generally constant permeability of approximately 38 D. The Hassler sleeve holder was disconnected and then heated to approximately 60° C. for 10 hours to accelerate PLA coating removal. After the heat treatment, further measurements were made with an observed 26 fold decrease in permeability. The results are presented in Table 3 below and in FIG. 3.

TABLE 3

| Time (hr:min) | Permeability (Darcy) Sand + 21.5 wt % Coated Bentonite Composite |
|---|---|
| 00:30 | 38 |
| 1:30 | 38 |
| 8:00 | 8 |
| 8:02 | 5 |
| 8:03 | 1.5 |
| 8:04 | 1.4 |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a formation penetrated by a wellbore comprising:
   providing a quantity of particles comprising delayed water-swelling particulates and non-water-swelling particulates, wherein the delayed water-swelling particulates and non-water-swelling particulates are of different size distributions and the delayed water-swelling particulates are formed from particulates having a core of water-swelling material coated with a coating of a water degradable material; wherein the core is an internally crosslinked network formed from water soluble polymers; wherein the water degradable material comprises a solid polymer acid precursor, and the water degradable material substantially surrounds the core of water-swelling material and temporarily prevents contact of water with the water-swelling material; wherein the delayed water-swelling particulates are used with the non-water-swelling particulates in an amount of from about 0.5% to about 50% by total weight of particles;
   forming a slurry of the particles with a carrier fluid; and
   introducing the slurry of particles into the wellbore of the formation.

2. The method of claim 1, wherein:
the non-water-swelling particulates have a particle size of from about 0.035 mm to about 2.35 mm.

3. The method of claim 1, wherein:
non-water-swelling particulates of at least two different size distributions are used wherein the mean particle size of the larger non-water-swelling particulates is at least 1.5 times greater than that of the smaller non-water-swelling particulates.

4. The method of claim 1, wherein:
the non-water-swelling particulates comprise coarse particles having a particle size of from about 0.2 mm to about 2.35 mm and at least one of fine particles having a particle size of less than about 0.1 mm and medium particles having a particle size of from about 0.1 mm to less than about 0.2 mm.

5. The method of claim 4, wherein:
the water-swelling material comprises a superabsorbent material that has been surface cross-linked to delay swelling.

6. The method of claim 1, wherein:
the particles have a specific gravity that is at least one of the same, greater or less than the specific gravity of the carrier fluid.

7. The method of claim 1, wherein:
the core is a superabsorbing material.

8. The method of claim 7, wherein:
the superabsorbing material is selected from the group consisting of polymers and copolymers of acrylate, acrylic acid, amide, acrylamide, saccharides, vinyl alcohol, urethane, and combinations of these materials.

9. The method of claim 1, wherein:
the water degradable material comprises polylactic acid.

10. The method of claim 1, wherein:
the delayed water-swelling particulates contain a weighting material.

11. The method of claim 10, wherein:
the weighting material is selected from the group consisting of silicates, aluminosilicates, barite, hematite, ilmenite, manganese tetraoxide, manganosite, iron, lead, aluminum and combinations of these.

12. The method of claim 1, wherein:
the carrier fluid comprises at least one of a drilling mud or a completion brine.

13. A method of treating a subterranean formation immediately surrounding a wellbore penetrating the formation to reduce lost fluid circulation during drilling operations comprising:
providing a quantity of particles comprising delayed water-swelling particulates, wherein the delayed water-swelling particulates are formed from particles having a core of water-swelling material coated with a coating of a water degradable material,
wherein the core is an internally crosslinked network formed from water soluble polymers,
wherein the water degradable material comprises a solid polymer acid precursor, and substantially surrounds the core of water-swelling material and temporarily prevents contact of water with the water swelling material,
wherein the particles also comprise non-water-swelling particulates and the delayed water-swelling particulates are used with the non-water-swelling particulates in an amount of from about 0.5% to about 50% by total weight of particles;
forming a slurry of the particles with a carrier fluid; and
introducing the slurry into the wellbore at a pressure sufficient to fracture a portion of the formation.

14. The method of claim 13, wherein:
the carrier fluid comprises at least one of a drilling mud or a completion brine.

15. The method of claim 13, wherein:
non-water-swelling particulates of at least two different size distributions are used wherein the mean particle size of the larger non-water-swelling particulates is at least 1.5 times greater than that of the smaller non-water-swelling particulates.

16. The method of claim 13, wherein:
the non-water-swelling particulates comprise coarse particles having a particle size of from about 0.2 mm to about 2.35 mm and at least one of fine particles having a particle size of less than about 0.1 mm and medium particles having a particle size of from about 0.1 mm to less than about 0.2 mm.

17. The method of claim 13, wherein:
the core is a superabsorbing material.

18. The method of claim 17, wherein:
the superabsorbing material is selected from the group consisting of polymers and copolymers of acrylate, acrylic acid, amide, acrylamide, saccharides, vinyl alcohol, urethane, and combinations of these materials.

19. The method of claim 13, wherein:
the water degradable material comprises polylactic acid.

20. The method of claim 13, further comprising:
circulating a drilling fluid within the wellbore during drilling after introduction of the slurry.

21. The method of claim 13, further comprising:
introducing a cement into the wellbore after introduction of the slurry.

22. The method of claim 13, further comprising:
introducing a further well treatment fluid into the wellbore after introduction of the slurry.

* * * * *